United States Patent
Holt

[15] 3,649,841
[45] Mar. 14, 1972

[54] ELECTRICAL SYSTEMS FOR ROAD VEHICLES

[72] Inventor: William David Holt, Colne, Lancashire, England

[73] Assignee: Joseph Lucas (Industries) Limited, Birmingham, England

[22] Filed: Apr. 21, 1970

[21] Appl. No.: 30,561

[30] Foreign Application Priority Data

July 28, 1969 Great Britain .................. 37,709/69

[52] U.S. Cl. ........................................... 307/10
[51] Int. Cl. ........................................... H02g 3/00
[58] Field of Search .......... 307/11, 38, 39, 40, 10, 127, 307/112, 138, 149

[56] References Cited

UNITED STATES PATENTS 3,147,385   9/1964   Burgis ........................... 307/38

Primary Examiner—Herman J. Hohauser
Attorney—Holman, Glascock, Downing & Seebold

[57] ABSTRACT

An electrical system for a road vehicle has a pair of electrical loads, a plurality of switches controlling the loads respectively, a plurality of feed lines, means whereby each switch when operated energizes two or more feed lines in a unique manner, switching means sensitive to the way in which the feed lines are energized for switching the loads on and off under the control of their respective switches, and at least one instrument on the vehicle. The instrument has a reading which is determined by a variable resistor in some other part of the vehicle, and in accordance with the invention it is found possible to make the connection between the instrument and resistor through one of the feed lines.

2 Claims, 1 Drawing Figure

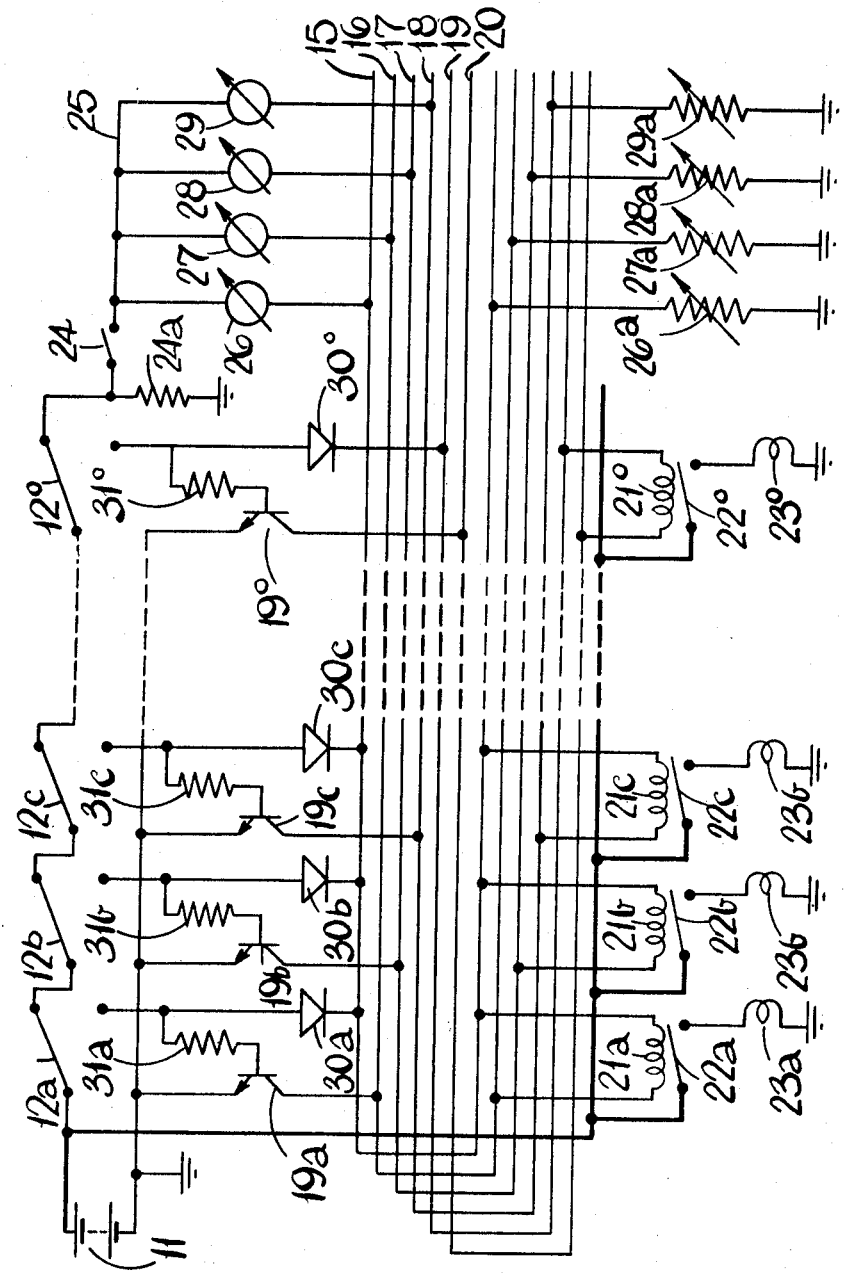

ELECTRICAL SYSTEMS FOR ROAD VEHICLES

This invention relates to electrical systems for road vehicles.

An electrical system according to the invention includes a pair of electrical loads, a plurality of switches controlling the loads respectively, a plurality of feed lines, means whereby each switch when operated energizes two or more feed lines in a unique manner, switch means sensitive to the way in which the feed lines are energized for switching the loads on and off under the control of their respective switches, at least one instrument on the vehicle, and a variable resistor the value of which is determined by the parameter to be indicated on the instrument, the connection between the instrument and resistor being made through one of the feed lines.

The accompanying drawing is a circuit diagram illustrating one example of the invention.

Referring to the drawing, the positive terminal of a vehicle battery 11 is connected to fifteen series connected switches 12a to 12o which are resiliently urged to the positions shown but are so connected that when any of the switches is moved from the position shown to its alternative position, the circuit to the remaining switches is broken.

The vehicle further includes six feed lines 15 to 20 which can be connected to the vehicle battery in various combinations under the control of the switches 12a to 12o. Thus, closing of the switch 12a connects the line 15 to the positive battery terminal, and at the same time provides base current through a resistor 31a to an NPN-transistor having its emitter connected to the negative battery terminal, and its collector connected to the line 16. The other switches 12b to 12o operate similarly by way of further diodes 30b to 30o and associated resistors 31b to 31o and transistors 19b to 19o.

Connected to various pairs of feed lines are the coils 21a to 21o of fifteen latching relays.

The relay coils control contacts 22a to 22o connected in series with loads 23a to 23o across the battery. All the relays are latching relays, and when a switch 12a to 12o is closed momentarily, one unique pair of feed lines is connected to the battery, the appropriate coil 12a to 12o is energized to close its contact, so that the appropriate load is energized and stays energized when the switch is returned to its normal position. Operation of the switch 12a to 12o a second time then deenergizes the load.

The contacts 12a to 12o complete a circuit through a contact 24 to a line 25. Connected between the line 25 and the feed lines 15 to 18 respectively, are instruments 26, 27, 28, 29 which may be any typical bimetal movement type or other highly damped instruments, such as the fuel gauge, oil gauge, water temperature gauge and so on. The contact 24 forms part of the conventional form of voltage regulator used in conjunction with such instruments, the regulator further including a bimetal strip and heater winding 24a connected between the line 25 and earth, and serving when hot to open the contact 24, thereby regulating the voltage on the line 25. Each of the instruments is connected in series with a variable resistor, the value of which is determined by the parameter which the instrument reads. The variable resistors are shown at 26a, 27a, 28a and 29a respectively, and it will be seen that the connection between an instrument and its resistor is made through one of the feed lines 15 to 18. It will be appreciated that this arrangement saves a considerable amount of wiring in the vehicle. There are two apparent difficulties in using the feed lines to supply current to the instruments in this way. Firstly, the supply to the line 25 is broken whenever one of the switches 12a to 12o is operated. However, the switches 12a to 12o are only ever operated momentarily, and so it is found in practice that this apparent disadvantage is unimportant. Secondly, sneak paths exist between the instrument circuits through the relay coils 21a to 21o. These sneak paths will cause the instrument having the lowest resistances to read incorrectly, but in practice the percentage error is so small that it is not significant.

Having thus described my invention, what I claim as new and desire to secure by Letters Patent is:

1. An electrical system for a road vehicle, including a pair of electrical loads, a plurality of switches controlling the loads respectively, a plurality of feed lines, means whereby each switch when operated energizes two or more feed lines in a unique manner, switching means sensitive to the way in which the feed lines are energized for switching the loads on and off under the control of their respective switches, at least one instrument on the vehicle, and a variable calibration resistor the value of which is determined by the parameter to be indicated on the instrument, the connection between the instrument and resistor being made through one of the feed lines.

2. A system as claimed in claim 1 in which the switches are connected in series so that when one switch is operated, the circuit to the succeeding switches is broken, each switch being resiliently urged to its off position and the switching means being designed to energize and deenergize a load successively as a result of successive actuations of the appropriate switch, the switches when closed also serving to complete a circuit to a supply line to which the instrument is connected, the instrument being damped so that actuation of a switch does not noticeably alter the meter reading.

* * * * *